US012637077B2

(12) United States Patent
Hall et al.

(10) Patent No.: US 12,637,077 B2
(45) Date of Patent: May 26, 2026

(54) METHOD FOR OPERATING A DRIVE DEVICE FOR A MOTOR VEHICLE AND CORRESPONDING DRIVE DEVICE

(71) Applicant: AUDI AG, Ingolstadt (DE)

(72) Inventors: Matthew David Hall, Marbach am Neckar (DE); Guido Schiedt, Leutenbach (DE); Andreas Zeyer, Stuttgart (DE)

(73) Assignee: AUDI AG, Ingolstadt (DE)

( * ) Notice: Subject to any disclaimer, the term of this patent is extended or adjusted under 35 U.S.C. 154(b) by 537 days.

(21) Appl. No.: 17/612,792

(22) PCT Filed: May 13, 2020

(86) PCT No.: PCT/EP2020/063296
§ 371 (c)(1),
(2) Date: Nov. 19, 2021

(87) PCT Pub. No.: WO2020/234078
PCT Pub. Date: Nov. 26, 2020

(65) Prior Publication Data
US 2022/0242411 A1      Aug. 4, 2022

(30) Foreign Application Priority Data

May 22, 2019    (DE) .......................... 102019207483.9

(51) Int. Cl.
*B60W 30/18* (2012.01)
*B60K 6/26* (2007.10)
(Continued)

(52) U.S. Cl.
CPC ......... *B60W 30/18027* (2013.01); *B60K 6/26* (2013.01); *B60K 6/387* (2013.01);
(Continued)

(58) Field of Classification Search
CPC ................. B60W 30/00; B60W 30/18; B60W 30/18009; B60W 30/18027; B60W 10/00;
(Continued)

(56) References Cited

U.S. PATENT DOCUMENTS 8,038,573 B2     10/2011  Kozub et al.
2006/0166783 A1     7/2006  Tamai et al.
(Continued)

FOREIGN PATENT DOCUMENTS

DE     102006040339 A1     3/2008
DE     102011104395 A1     12/2012
(Continued)

OTHER PUBLICATIONS

German Examination Report issued on Apr. 21, 2020 in corresponding German Patent Application No. 10 2019 207 483.9; 14 pages.
(Continued)

*Primary Examiner* — Khoi H Tran
*Assistant Examiner* — Sarah A Tran
(74) *Attorney, Agent, or Firm* — Maier & Maier, PLLC

(57) ABSTRACT
A method for operating a drive unit for a motor vehicle. The drive unit has at least one internal combustion engine, an electric machine which is or may be drivingly coupled to the internal combustion engine, and a start-up clutch, via which the internal combustion engine and the electric machine are drivingly connected to an output shaft of the drive unit. In a start-up operation mode of the drive unit, the internal combustion engine is operated without ignition when the start-up clutch is open, and is cranked by the electric machine to a start-up speed, which is greater than an idle speed of the internal combustion engine. The internal combustion engine is ignition-operated and the start-up clutch is closed upon reaching the start-up speed. The invention further relates to a drive unit for a motor vehicle.

17 Claims, 1 Drawing Sheet

(51) Int. Cl.

| | |
|---|---|
| *B60K 6/387* | (2007.10) |
| *B60K 6/48* | (2007.10) |
| *B60W 10/02* | (2006.01) |
| *B60W 10/06* | (2006.01) |
| *B60W 10/08* | (2006.01) |
| *B60W 20/19* | (2016.01) |

(52) U.S. Cl.

CPC ............... *B60K 6/48* (2013.01); *B60W 10/02* (2013.01); *B60W 10/06* (2013.01); *B60W 10/08* (2013.01); *B60W 20/19* (2016.01); *B60K 2006/268* (2013.01); *B60W 2710/021* (2013.01); *B60W 2710/0644* (2013.01); *B60W 2710/0666* (2013.01); *B60W 2710/083* (2013.01)

(58) Field of Classification Search

CPC ...... B60W 10/02; B60W 10/04; B60W 10/06; B60W 10/08; B60W 20/00; B60W 20/10; B60W 20/15; B60W 20/19; B60W 2710/00; B60W 2710/02; B60W 2710/06; B60W 2710/08; B60W 2710/021; B60W 2710/0644; B60W 2710/0666; B60W 2710/083; B60W 2540/00; B60W 2540/10; B60W 2540/12; B60K 6/00; B60K 6/20; B60K 6/22; B60K 6/26; B60K 6/38; B60K 6/387; B60K 6/42; B60K 6/48; B60K 6/50; B60K 6/54; B60K 6/547; B60K 2006/00; B60K 2006/20; B60K 2006/22; B60K 2006/26; B60K 2006/42; B60K 2006/48; B60K 2006/4825; B60K 2006/4833; B60K 2006/268; Y02T 10/00; Y02T 10/60; Y02T 10/62

USPC .......................................... 701/22

See application file for complete search history.

(56) References Cited

U.S. PATENT DOCUMENTS

| | | | | |
|---|---|---|---|---|
| 2008/0216787 A1* | 9/2008 | Kroepke | .............. | B60W 20/10 123/179.3 |
| 2013/0297105 A1* | 11/2013 | Yamazaki | ............. | B60W 10/02 903/902 |
| 2016/0003207 A1* | 1/2016 | Kojima | ................... | B60K 6/48 180/65.265 |
| 2018/0354493 A1 | 12/2018 | Johri et al. | | |
| 2019/0009781 A1 | 1/2019 | Segawa et al. | | |
| 2021/0023929 A1* | 1/2021 | Hoesl | ................... | B60W 20/19 |

FOREIGN PATENT DOCUMENTS

| | | | | |
|---|---|---|---|---|
| DE | 102014226067 A1 * | 6/2016 | ........... | B60W 10/02 |
| DE | 102017203623 A1 | 9/2018 | | |

OTHER PUBLICATIONS

International Preliminary Report on Patentability issued on Sep. 6, 2021 in corresponding International Application No. PCT/EP2020/063296; 11 pages.

* cited by examiner

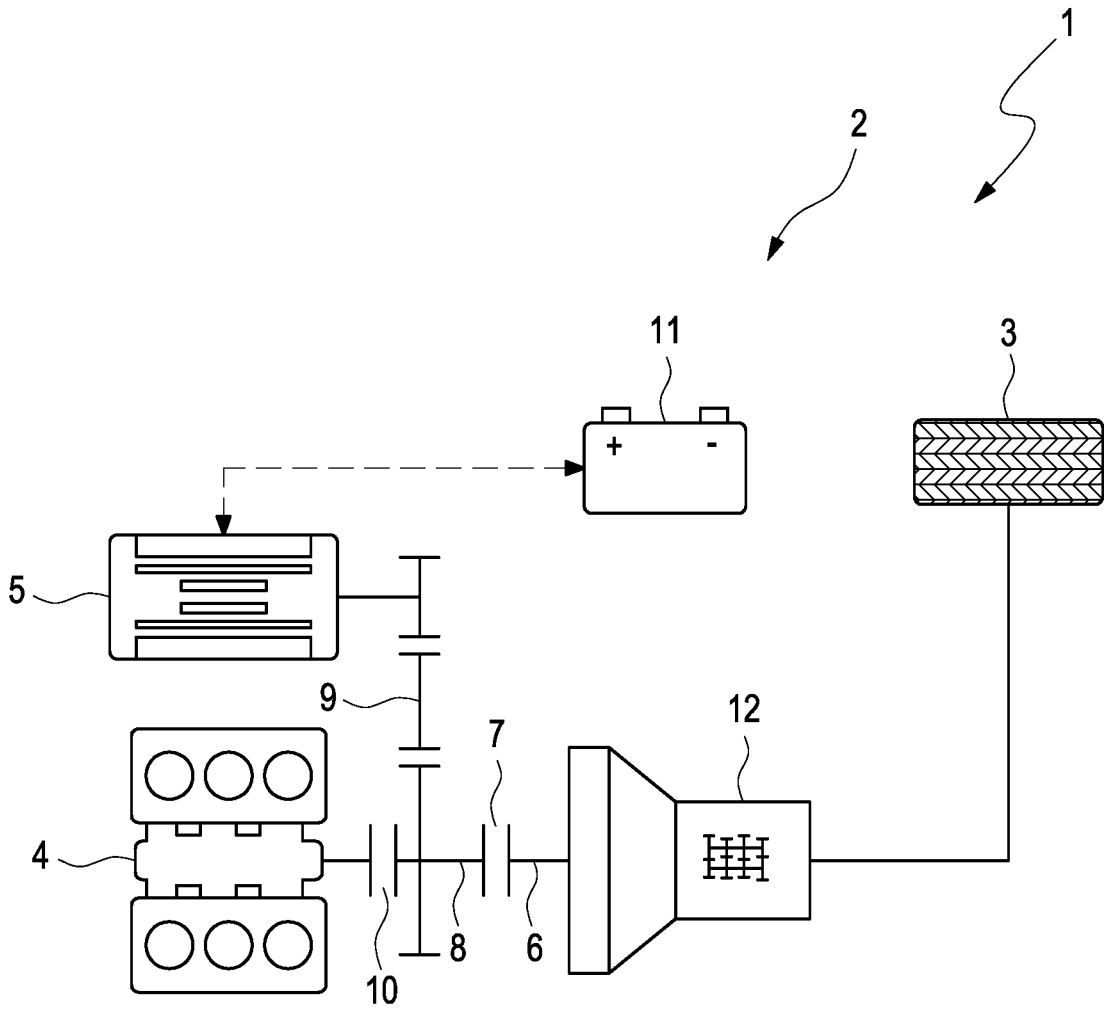

METHOD FOR OPERATING A DRIVE DEVICE FOR A MOTOR VEHICLE AND CORRESPONDING DRIVE DEVICE

FIELD

The invention relates to a method for operating a drive unit for a motor vehicle, wherein the drive unit has at least one internal combustion engine, an electric machine, which is coupled or may be drivingly coupled to the internal combustion engine, and a start-up clutch with which the internal combustion engine and the electric machine are drivingly connected to an output shaft of the drive unit. The invention further relates to a drive unit for a motor vehicle.

BACKGROUND

From the prior art, e.g., the publication DE 10 2017 203 623 A1 is known. This document describes a method for carrying out a start-up process for a motor vehicle with a hybrid drive train comprising an output shaft, a start-up element, and an internal combustion engine with an output shaft and an electric machine, which may be connected to the output shaft of the internal combustion engine, wherein the electric machine is operated as a generator during the start-up process in order to bias the internal combustion engine.

Furthermore, the document US 2013/0297105 A1 is known from the prior art. It describes a hybrid vehicle, with an internal combustion engine, an electric machine coupled to the internal combustion engine via a first clutch, a transmission coupled to the electric machine via a second clutch, and a control unit. The control unit is adapted to start the internal combustion engine by means of one of several start sequences, wherein the start sequence controls the electric machine, the first clutch, and the second clutch. The start sequence is selected depending on an input speed of the transmission gearbox and a driver request.

SUMMARY

The object of the invention is to propose a method for operating a drive unit for a motor vehicle, which has advantages over known methods, in particular very rapidly providing a high drive torque at the output shaft in a particularly efficient manner.

According to the invention, this is achieved by a method for operating a drive unit for a motor vehicle. In this case, it is provided that, in a start-up mode of the drive unit, the internal combustion engine is operated without fuel ignition and with fully open start-up clutch, and is cranked by the electric machine to a start-up speed, which is greater than an idle speed of the internal combustion engine, wherein the internal combustion engine is injection-operated, and the start-up clutch is closed after reaching the start-up speed.

The method is used for operating the drive unit, which is or may optionally be a component of the motor vehicle. The drive unit serves to drive the motor vehicle, i.e., provide a drive torque aimed at driving the motor vehicle. In order to generate the drive torque, the drive unit is has the internal combustion engine and the electric machine, which together provide the drive torque at least temporarily. However, it may also be provided that only the internal combustion engine is used temporarily and not the electric machine, and/or only the electric machine and not the internal combustion engine in order to provide the drive torque.

The electric machine is or at least may be drivingly coupled to the internal combustion engine. In the former case, the electric machine is in particular rigidly and/or permanently connected to the internal combustion engine. For example, the electric machine is directly coupled to an output shaft of the internal combustion engine, and is preferably arranged coaxially therewith. However, it may also be provided that the electric machine is drivingly coupled to the output shaft via an intermediate gear, wherein the intermediate gear has a transmission ratio that is not 1.

In the case of the electric machine coupled to the internal combustion engine, the internal combustion engine and the electric machine are jointly connected to the start-up clutch and may be coupled to the output shaft by means of the latter. In a first engagement setting of the start-up clutch, the internal combustion engine and the electric machine are thus jointly decoupled from the output shaft, whereas in a second engagement setting of the start-up clutch, they are jointly coupled to the output shaft.

However, it may also be provided that the electric machine can only be coupled to the internal combustion engine. For this purpose, the electric machine is connected to the internal combustion engine or its output shaft, e.g., via a disconnect clutch. Particularly preferably, the electric machine is drivingly coupled to an intermediate shaft, in particular rigidly and/or permanently, especially preferably via the intermediate gear. The intermediate shaft is connected, for example, on the one hand, to the internal combustion engine via the disconnect clutch and on the other hand, to the output shaft of the drive unit via the start-up clutch.

Similarly to the above embodiments, the output shaft is decoupled from the intermediate shaft, when the first engagement setting of the start-up clutch is present, and coupled thereto, when the second engagement setting is present. When the start-up clutch is closed, i.e., when the second shift setting is present, at least the electric machine is drivingly coupled to the output shaft. If, moreover, the disconnect clutch between the internal combustion engine and the electric machine is at least partially or completely closed, then the internal combustion engine is additionally drivingly coupled to the output shaft of the drive unit.

In terms of drive technology, the start-up clutch is located between the internal combustion engine and the electric machine, on the one hand, and the output shaft of the drive unit, on the other. The output shaft is preferably drivingly coupled to at least one wheel of the motor vehicle, more preferably several wheels of the motor vehicle, for example, via a manual or automatic gearbox. The gearbox is used to set a transmission ratio selected from several transmission ratios between the output shaft and the at least one wheel of the motor vehicle. This means that the gearbox has several ratios, one of which is selected and set on the gearbox, such that the set gear ratio is subsequently present between the output shaft and the at least one wheel.

The drive unit can now be operated, e.g., in an idle operation mode. In this position, the start-up clutch is open or fully open, i.e., in its first shift position. Accordingly, both the internal combustion engine and the electric machine are fully decoupled from the output shaft. In the idle operating mode, the internal combustion engine is operated with fuel-injection idle speed. This means that fuel is supplied to the internal combustion engine and the internal combustion engine is set to generate a torque corresponding to a drag torque of the internal combustion engine at the respective existing speed of the internal combustion engine. In this respect, the speed of the internal combustion engine remains constant or at least almost constant.

The speed of the internal combustion engine is set to the idle speed, in particular it is adjusted to the idle speed. The idle speed refers to a speed of the internal combustion engine which is greater than a minimum speed of the internal combustion engine and is selected such that the internal combustion engine runs smoothly and, at the same time, generates modest noise and consumes little fuel. The minimum speed, on the other hand, is the speed from which the internal combustion engine can be operated without an externally supplied torque, i.e., from which the internal combustion engine can further increase its speed automatically and without the influence of the external torque. The idle speed is usually set on the drive unit, when the motor vehicle is stationary, i.e., at zero speed, or is used for operating the drive unit.

If, on the other hand, the motor vehicle is to accelerate as quickly as possible, the start-up mode is set on the drive unit. The start-up mode realizes a so-called launch control of the motor vehicle, which in particular causes maximum and/or a particularly effective acceleration of the motor vehicle. In the start-up operating mode, the start-up clutch is open, namely fully open, such that the internal combustion engine and the electric machine are fully decoupled from the output shaft. If the start-up clutch is still closed or at least partially closed, when the start-up mode is initiated, it will open fully.

If the start-up clutch is fully open, the internal combustion engine is cranked to the start-up speed by the electric motor, while at the same time, it is operated without fuel injection. Operation without fuel injection means operation of the internal combustion engine without fuel being supplied. For operation without fuel injection, the fuel supply to the internal combustion engine is interrupted. During operation without fuel injection, no combustion of the fuel takes place in the internal combustion engine.

The internal combustion engine is thus cranked to the start-up speed exclusively by the electric machine, which receives electrical energy for this purpose, e.g., from an energy storage device of the motor vehicle or the drive unit. The start-up speed is greater than the idle speed of the internal combustion engine, for example, the start-up speed is greater than the idle speed by a factor of at least 2. Particularly preferably, the start-up speed is greater than the idle speed by a factor of at least 5, at least 7.5, or at least 10.

If the internal combustion engine has reached the start-up speed, i.e., if its current speed equals the start-up speed, the internal combustion engine is operated with fuel injection and the start-up clutch is closed. Only upon reaching the start-up speed is the internal combustion engine switched from non-fuel injection to fuel-injection operation. Only after this switchover is the start-up torque at least partially provided by the internal combustion engine. For this purpose, the start-up clutch is furthermore closed. This method is highly energy-efficient and, moreover, comfortable for an occupant of the motor vehicle, in that operation without fuel injection of the internal combustion engine and its acceleration by the electric machine is accompanied by a low level of noise development only and occurs with considerably less noise and vibration than does fuel-injection acceleration of the internal combustion engine up to the start-up speed.

Usually, the start-up mode is initiated from the idle operation mode, i.e., the drive unit is switched directly from the idle operation mode to the start-up mode. In the idle operation mode, the internal combustion engine is operated with fuel injection, while in the start-up mode, the internal combustion engine is initially operated without fuel injection. Accordingly, when the engine is switched from idle operation mode to the start-up mode, the engine is switched from operation with fuel injection to operation without fuel injection, while, at the same time, cranking the engine to the start-up speed is initiated by the electric machine. The electric machine is operated such that, despite the switchover of the internal combustion engine from operation with fuel injection to operation without fuel injection, there is no reduction of the speed, however, the speed is increased continuously by means of the electric machine, starting from the idle speed up to the start-up speed. This allows for the above-mentioned advantages to be achieved.

For example, it is provided to initiate the start-up mode of the drive unit as soon as a service brake of the motor vehicle is activated and an accelerator pedal of the motor vehicle is depressed. Operation without fuel injection of the internal combustion engine and cranking to the start-up speed by the electric motor thus takes place with the service brake activated, such that the motor vehicle remains stationary. Even upon reaching the start-up speed, the start-up clutch initially remains open, such that the motor vehicle continues to remain stationary. It may be provided that the internal combustion engine continues its operation without fuel injection and is kept at the start-up speed by the electric machine.

However, it may also be provided that the internal combustion engine is switched from operation without fuel injection to operation with fuel injection after reaching the start-up speed. Particularly preferably, the start-up clutch is kept open until the release of the service brake of the motor vehicle, e.g., by no a brake pedal of the motor vehicle no longer being depressed. Preferably, the start-up clutch is closed immediately upon releasing the service brake, such that the torque provided by the internal combustion engine is applied to the output shaft as drive torque, and the motor vehicle accelerates.

According to a further embodiment of the invention, the operation with fuel injection of the internal combustion engine is initiated immediately after reaching the start-up speed. This was already referred to above. Particularly preferably, the start-up clutch remains initially closed, even upon reaching the start-up speed and initiation of fuel-injection operation of the internal combustion engine, in particular until the service brake of the motor vehicle is released or is fully released. Initiating fuel-injection operation immediately upon reaching the start-up speed ensures that a high drive torque is immediately provided by the internal combustion engine, as the start-up clutch is being closed.

According to a further embodiment of the invention, upon initiation of fuel-injection operation of the internal combustion engine by means of the electric machine, a torque is generated, which corresponds in magnitude to a torque provided by the internal combustion engine and is opposed thereto. When picking up fuel-injection operation, the internal combustion engine is preferably set, such that it will supply a torque. In other words, the torque generated by the internal combustion engine is greater than the friction torque of the internal combustion engine at the current speed, in particular the start-up speed.

In order to nonetheless keep the internal combustion engine at its start-up speed, the electric machine is actuated, such that a torque opposing the torque of the internal combustion engine is generated. In other words, the electric machine is set, such that the speed of the internal combustion engine is kept at the start-up speed. Thus, for example, the internal combustion engine and the electric machine have the same rated power. Preferably, the internal combustion engine is set, such that it provides the maximum possible torque at the current speed, in particular the start-up speed. If the torque which can be provided by the electric machine is smaller than the aforementioned torque, the torque of the internal combustion engine is particularly preferably set to the maximum torque that can be provided by the electric machine.

Expressed in a different way, the internal combustion engine is already prepared to provide a large drive torque, which is initially counteracted by the electric machine. The electric machine is thus used to bias the internal combustion engine. This results in an exceedingly rapid supply of drive torque, whereby high acceleration of the motor vehicle is achieved.

A further embodiment of the invention provides that the torque is supplied by the electric machine through regenerative operation of the electric machine, and electric energy provided during the regenerative operation by the electric machine is temporarily stored or converted into heat. As mentioned above, the electric machine may be electrically connected to an energy storage device, which is used for intermediate storage of electric energy. On the one hand, the electric machine can be operated by means of electrical energy, which is drawn from the energy storage device. On the other hand, electrical energy made available by the electric machine can be supplied to the energy storage device.

After initiating fuel-injection operation of the internal combustion engine in the start-up mode, the electric machine picks up the torque generated by the internal combustion engine. In this way, the mechanical energy of the internal combustion engine is converted to electrical energy. The electrical energy is temporarily stored, e.g., in the energy storage device. It is particularly advantageously provided that the electric machine is operated with electric energy drawn from the energy storage device in order to crank the internal combustion engine to the start-up speed. This means that the charge level of the energy storage device decreases. During regenerative operation of the electric machine in order to maintain the internal combustion engine at the start-up speed, electrical energy is re-supplied to the energy storage device in order to at least partially, or even fully, replace the previously extracted electrical energy.

However, it may also be provided that the electrical energy supplied by the electric machine is converted directly into heat, e.g., by short-circuiting the electric machine. Such an approach can be implemented in particular if the energy storage device torque; is completely full, i.e., cannot absorb any more electrical energy. For example, during fuel-ignition operation of the internal combustion engine, the electrical energy provided by the electric machine is fed into the energy storage device torque until it is completely filled. Subsequently, the electrical energy is converted into heat, especially until the start-up clutch is closed. Such an approach always allows the internal combustion engine to be biased with the aid of the electric machine.

According to a further embodiment of the invention, after initiation of fuel-injection operation of the internal combustion engine, the start-up clutch is closed. The start-up clutch therefore will not close until after fuel-ignition operation has been initiated, such that there is a time lag. This ensures that the internal combustion engine provides a sufficiently high torque, when the start-up clutch is closed. Particularly preferably, the start-up clutch is only closed when the internal combustion engine provides a preset target torque, which is counteracted by means of the electric machine. The target torque may equal, e.g., the maximum possible torque at the start-up speed. Again, the described method ensures rapid acceleration of the motor vehicle.

A further embodiment of the invention provides that the electric machine is deactivated, when the start-up clutch is closed, or a torque assisting the torque of the internal combustion engine is generated by the electric machine after the start-up clutch is closed. Deactivation of the electric machine takes place in particular, if the torque counteracting the torque of the internal combustion engine was previously generated by the electric machine. As a result of switching off the electric machine, the drive torque of the drive unit applied to the output shaft is provided in this case solely by the internal combustion engine.

Alternatively, it may be provided that the torque generated by the internal combustion engine is assisted by the electric machine, such that the drive torque applied to the output shaft is composed of the torque generated by the internal combustion engine, as well as the torque generated by the electric machine. Particularly preferably, the internal combustion engine is used to generate the maximum possible torque at the start-up speed, whereas the electric machine is operated, such that the drive torque applied to the output shaft matches a target drive torque. The target drive torque is specified, for example, by the driver of the motor vehicle or a driver assistance device of the motor vehicle. Of course, it may also be provided that it is possible to control the electric machine in order to generate its maximum torque, such that the maximum achievable drive torque is applied to the output shaft. This makes it possible to achieve a particularly high power output.

A further embodiment of the invention provides that the start-up speed is selected to be equal to the speed at which the internal combustion engine provides a maximum torque.

The maximum torque corresponds to the highest torque of the internal combustion engine over all its possible speeds. It is not to be equated with the maximum torque, which refers to the greatest torque at any given speed. Obviously, however, the maximum torque and the maximum torque, at which the maximum torque may be retrieved at the internal combustion engine coincide, i.e., match each other. The described method ensures that a particularly high drive torque is achieved at the output shaft.

A further embodiment of the invention provides that the start-up speed is selected to be equal to a speed, at which the maximum torque of the internal combustion engine matches the maximum torque that can be provided by the electric machine. In this case, the maximum torque matches the maximum torque that can be achieved at the start-up speed with the aid of the internal combustion engine. The maximum torque can, but need not correspond to the maximum achievable torque. [Translator's note: unclear original, perhaps it means: maximum torque that can be provided by the electric machine] The maximum torque should now match the maximum torque that can be provided by the electric machine, such that the torque generated by the internal combustion engine can be compensated by the electric machine, thus making possible the described biasing of the internal combustion engine.

Based on this maximum torque, which matches the maximum torque that can be provided by the electric machine, the speed at which this maximum torque is present or represents the greatest possible torque of the internal combustion engine is determined. Subsequently the start-up speed is set as equal to this speed. This ensures that a high drive torque is achieved, despite the limitation imposed by the electric machine.

A further embodiment of the invention provides that, in terms of drive technology, a disconnect clutch is provided between the internal combustion engine and the electric machine, which is closed by the electric machine in order to crank the internal combustion engine. The disconnect clutch was already referred to above. In a first switch setting, the disconnect clutch is open, such that the internal combustion engine is drivingly separated from the electric machine. In a second switch position, on the other hand, the disconnect clutch is closed, such that the internal combustion engine is drivingly coupled to the electric machine, preferably rigidly. To enable cranking of the internal combustion engine by the electric machine, the disconnecting clutch is closed.

This is particularly the case if the drive unit was previously operated in the idle operation mode, in which the disconnect clutch is open. The disconnect clutch enables particularly high energy efficiency of the drive unit.

The invention further relates to a drive unit for a motor vehicle, in particular for implementing the method according to the explanations that are part of this description, wherein the drive unit comprises at least one internal combustion engine, an electric machine, which is or may be drivingly coupled to the internal combustion engine, and a start-up clutch via which the internal combustion engine and the electric machine are drivingly connected to an output shaft of the drive unit. Here, it is provided that the drive unit is designed to operate the internal combustion engine without fuel injection, when the start-up clutch is fully open, in a start-up operating mode of the drive unit, and crank it by means of the electric machine to a start-up speed which is greater than an idle speed of the internal combustion engine, wherein the internal combustion engine is fuel-ignition-operated and the start-up clutch is closed after reaching the start-up speed.

The advantages of such an embodiment of the drive unit, as well as such a method, have already been laid out above. Both the drive unit and the original, perhaps method for its operation can be developed further in accordance with the explanations, which are part of this description, hence reference is made thereto.

The invention obviously also relates to a motor vehicle having such a drive unit.

BRIEF DESCRIPTION OF THE FIGURES

The invention will be explained in more detail below with reference to the exemplary embodiments shown in the drawing, without limiting the invention.

FIGURE is a schematic diagram of a drive unit for a motor vehicle.

DETAILED DESCRIPTION

The FIGURE shows a schematic diagram of a motor vehicle 1 having a drive unit 2 and at least one wheel 3, which can be driven by means of the drive unit 2. The drive unit 1 has an internal combustion engine 4 and an electric machine 5, which are at least temporarily drivingly coupled to an output shaft 6 of the drive unit 2. In the exemplary embodiment shown here, the output shaft 6 is drivingly connected to an intermediate shaft 8 via a start-up clutch 7, which is rigidly and permanently coupled to the electric machine 5.

For example, the electric machine 5 is connected to the intermediate shaft 8 via an intermediate gear 9. The internal combustion engine 4, on the other hand, is drivingly connected to the intermediate shaft 8 via a disconnect clutch 10.

In this respect, when the disconnecting clutch 10 is open, the intermediate shaft 8 is fully decoupled from the internal combustion engine 4, and when the disconnect clutch 10 is closed, it is rigidly connected thereto. Similarly, the output shaft 6 is fully decoupled from the intermediate shaft 8, when the start-up clutch 7 is open, and rigidly coupled thereto, when the start-up clutch 7 is closed. The electric machine 5 is electrically connected to an energy storage device 11, which is used for intermediate storage of electrical energy.

In the depicted exemplary embodiment, the output shaft 6 is drivingly connected to the at least one wheel 3 of the motor vehicle 1 via a gearbox 12. Obviously, the gearbox 12 may be provided elsewhere in the drive unit 2, or may be omitted altogether. It is also possible for the start-up clutch 7 to be designed as integrated into the gearbox 12, such that the output shaft 6 is also provided in the gearbox 12, e.g., as a layshaft, or the like.

It is now provided that, in a start-up operating mode of the drive unit 2, the start-up clutch 7 is opened fully, if not already fully open. Subsequently, the internal combustion engine 4 is cranked by the electric machine 5 to a start-up speed that is greater than the idle speed of the internal combustion engine 4. In this case, the internal combustion engine 4 is operated without fuel ignition. This means that no fuel is burned therein, in particular no fuel is being supplied thereto. The electrical energy for cranking the internal combustion engine 4 by means of the electric machine 5 is preferably drawn from the energy storage device 11.

After reaching the start-up speed, the internal combustion engine 4 is switched from non-fuel-ignition operation to fuel-ignition operation. Preferably, the internal combustion engine 4 is adjusted, such that a torque greater than 0 Nm is supplied. At the same time, the electric machine 5 is actuated, such that it generates a torque, which counteracts the torque of the internal combustion engine 4 and matching it in terms of magnitude. Accordingly, despite the generated torque, the speed of the internal combustion engine 4 is kept constant, namely at the start-up speed, by means of the electric machine 5.

In order to accelerate the motor vehicle 1, the start-up clutch 7 is subsequently closed, and the electric machine 5 is either deactivated or set to assist the torque generated by the internal combustion engine 4. In the latter case, a drive torque is present at the output shaft 6 and is provided jointly by the internal combustion engine 4 and the electric machine 5. Due to the previously performed biasing of the internal combustion engine 4, a very large drive torque can be provided very rapidly at the output shaft.

REFERENCE NUMERAL LIST

1 Motor vehicle
2 Drive unit
3 Wheel
4 Internal combustion engine
5 Electric machine
6 Output shaft
7 Start-up clutch
8 Intermediate shaft
9 Intermediate gear
10 Disconnect clutch
11 Energy storage device
12 Manual gearbox

The invention claimed is:

1. A method for operating a drive unit for a motor vehicle, wherein the drive unit comprises an internal combustion engine, an electric machine configured to be coupled to the internal combustion engine, and a start-up clutch, via which the internal combustion engine and the electric machine are configured to connect to an output shaft of the drive unit, wherein, in a start-up operating mode of the drive unit, the method comprises:

selecting a start-up speed to be equal to a speed at which the internal combustion engine provides maximum torque over all possible speeds of the internal combustion engine, wherein the speed is determined based upon the maximum torque;

cranking the internal combustion engine exclusively by the electric machine without fuel ignition, until reaching the start-up speed which is greater than an idle speed of the internal combustion engine;

after reaching the start-up speed, operating the internal combustion engine with fuel-ignition; and closing the start-up clutch.

2. The method according to claim 1, further comprising:

initiating fuel-ignition operation of the internal combustion engine immediately after reaching the start-up speed.

3. The method according to claim 2, wherein upon initiation of the fuel-ignition operation of the internal combustion engine by the electric machine, a torque is generated, which corresponds in magnitude to a torque provided by the internal combustion engine and is directed opposite thereto.

4. The method according to claim 2, further comprising:

closing the start-up clutch after initiation of fuel-ignition operation of the internal combustion engine.

5. The method according to claim 2, further comprising:

closing the start-up clutch;

after the start-up clutch is closed, deactivating the electric machine.

6. The method according to claim 1, wherein upon initiation of the fuel-ignition operation of the internal combustion engine by the electric machine, a torque is generated, which corresponds in magnitude to a torque provided by the internal combustion engine and is directed opposite thereto.

7. The method according to claim 6, wherein the torque is provided by the electric machine due to regenerative operation of the electric machine, and the electrical energy provided by the electric machine is temporarily stored or converted into heat during the regenerative operation.

8. The method according to claim 7, further comprising:

closing the start-up clutch after initiation of fuel-ignition operation of the internal combustion engine.

9. The method according to claim 7, further comprising:

closing the start-up clutch;

after the start-up clutch is closed, deactivating the electric machine.

10. The method according to claim 6, further comprising:

closing the start-up clutch after initiation of fuel-ignition operation of the internal combustion engine.

11. The method according to claim 6, further comprising:

closing the start-up clutch;

after the start-up clutch is closed, deactivating the electric machine.

12. The method according to claim 1, further comprising:

closing the start-up clutch after initiation of fuel-ignition operation of the internal combustion engine.

13. The method according to claim 12, further comprising:

closing the start-up clutch;

after the start-up clutch is closed, deactivating the electric machine.

14. The method according to claim 1, further comprising:

closing the start-up clutch;

after the start-up clutch is closed, deactivating the electric machine.

15. The method according to claim 1, further comprising:

wherein selecting the start-up speed to be equal to a speed at which a maximum torque of the internal combustion engine corresponds to a maximum torque which can be provided by the electric machine.

16. The method according to claim 1, wherein a disconnecting clutch is drivingly provided between the internal combustion engine and the electric machine and is closed in order to crank the internal combustion engine by the electric machine.

17. A drive device for a motor vehicle comprising:

an internal combustion engine;

an electric machine configured to be coupled to the internal combustion engine and a start-up clutch, via which the internal combustion engine and the electric machine are configured to connect to an output shaft of the drive unit, wherein, in a start-up operating mode of the drive unit, the method comprises:

selecting a start-up speed to be equal to a speed at which the internal combustion engine provides maximum torque over all possible speeds of the internal combustion engine, wherein the speed is determined based upon the maximum torque;

cranking the internal combustion engine exclusively by the electric machine without fuel ignition, until reaching the start-up speed which is greater than an idle speed of the internal combustion engine;

after reaching the start-up speed, operating the internal combustion engine with fuel-ignition; and closing the start-up clutch.

* * * * *